(12) United States Patent
Al-Hussain

(10) Patent No.: US 7,618,220 B2
(45) Date of Patent: Nov. 17, 2009

(54) ROTARY TOOL

(76) Inventor: Mariam Jaber Suliman Al-Hussain, Area 3, Street 46, House 17, Abraq Khaitan (KW)

( * ) Notice: Subject to any disclaimer, the term of this patent is extended or adjusted under 35 U.S.C. 154(b) by 272 days.

(21) Appl. No.: 11/375,015

(22) Filed: Mar. 15, 2006

(65) Prior Publication Data

US 2007/0237590 A1 Oct. 11, 2007

(51) Int. Cl.
B23B 51/08 (2006.01)
(52) U.S. Cl. .................. 408/22; 408/36; 408/118; 420/105; 407/29.13
(58) Field of Classification Search ............ 408/22, 408/25, 24, 26, 36, 118, 219, 222, 225; 420/105, 420/107; 407/29.1, 30, 29.13, 29.14, 29.15
See application file for complete search history.

(56) References Cited

U.S. PATENT DOCUMENTS

| | | | | |
|---|---|---|---|---|
| 816,277 | A * | 3/1906 | Townley | 408/22 |
| 1,063,074 | A * | 5/1913 | Shirer | 408/231 |
| 1,496,979 | A * | 6/1924 | Armstrong et al. | 420/12 |
| 1,496,980 | A * | 6/1924 | Armstrong | 420/102 |
| 1,688,136 | A * | 10/1928 | Chayes et al. | 279/76 |
| 2,101,583 | A * | 12/1937 | Honneknovel | 408/22 |
| 2,570,945 | A * | 10/1951 | Hawkins | 7/158 |
| 2,978,846 | A * | 4/1961 | Barron | 451/541 |
| 3,076,356 | A * | 2/1963 | Simich | 408/223 |
| 3,202,228 | A * | 8/1965 | Schuster | 175/53 |
| 3,346,894 | A * | 10/1967 | Lemelson | 408/12 |
| 3,469,641 | A * | 9/1969 | Reynolds | 175/389 |
| 3,550,229 | A * | 12/1970 | Zenses | 407/29.13 |
| 3,951,012 | A * | 4/1976 | Staley, Jr. | 76/24.1 |
| 4,116,578 | A * | 9/1978 | Gelfand et al. | 408/222 |
| 4,483,108 | A * | 11/1984 | Howard | 451/41 |
| 4,720,218 | A * | 1/1988 | DeFries et al. | 408/145 |
| 4,729,872 | A * | 3/1988 | Kishida et al. | 420/105 |
| 4,852,672 | A * | 8/1989 | Behrens | 175/389 |
| 4,886,640 | A * | 12/1989 | Garner, Jr. et al. | 420/111 |
| 5,000,630 | A * | 3/1991 | Riley et al. | 408/228 |
| 5,123,217 | A * | 6/1992 | Ishikawa et al. | 451/541 |
| 5,362,338 | A * | 11/1994 | Iwama et al. | 148/334 |
| 5,435,827 | A * | 7/1995 | Wisell | 75/236 |
| 5,676,497 | A * | 10/1997 | Kim | 408/21 |
| 5,733,074 | A * | 3/1998 | Stock et al. | 408/17 |

(Continued)

FOREIGN PATENT DOCUMENTS

JP 58123859 A * 7/1983

(Continued)

Primary Examiner—Eric A Gates
(74) Attorney, Agent, or Firm—Lowe Hauptman Ham & Berner, LLP

(57) ABSTRACT

A one or two-piece rotary drill includes a steel shank adapted to fit into a chuck of an electric drill, a drill bit and a frusto conical or frusto spherical file between the shank and the drill bit and all of which are disposed on a common longitudinal axis. The frusto conical or frusto spherical file includes a plurality of crowned teeth about its periphery and wherein each of the teeth have a front cutting side and a back side which includes a plurality of sharp serrations thereon. The composition of the steel tool includes carbon, silicon, molybdenum and chrome. A rotary tool set including a plurality of drill bits and file portions having a plurality of shapes is also disclosed.

2 Claims, 4 Drawing Sheets

U.S. PATENT DOCUMENTS

| | | | |
|---|---|---|---|
| 5,915,893 A * | 6/1999 | Miyanaga | 408/202 |
| 6,196,908 B1 * | 3/2001 | Adams | 451/461 |
| 6,890,133 B2 * | 5/2005 | Singh et al. | 408/225 |
| 2004/0047757 A1 * | 3/2004 | Takayama | 420/107 |

FOREIGN PATENT DOCUMENTS

| | | | |
|---|---|---|---|
| JP | 2006102870 A | * | 4/2006 |

* cited by examiner

ROTARY TOOL

FIELD OF THE INVENTION

This invention relates to a rotary tool for performing a plurality of operations on a workpiece and more particularly to a rotary drill of the type having a unitary shank adapted to fit into the chuck of an electric drill, a drill bit and a frusto conical file between the shank and drill bit all of which are disposed along a common longitudinal axis.

BACKGROUND FOR THE INVENTION

Rotary tools for performing a plurality of operations on a workpiece have been known for many years. For example, a U.S. Pat. No. 3,346,894 of Lemelson entitled, "Apparatus For Controlling Rotary and Longitudinal Movements Of A Combination Tool Carrying Spindle," discloses a combination tool including a drill and a further portion for performing a secondary operation on a workpiece during or immediately following the cutting of a hole in the workpiece with the drill. As disclosed, the rotary drill includes a twist drill connected to a tapered head. The tapered head is connected to a shank and includes a plurality of replaceable blades.

A more recent U.S. Pat. No. 5,282,705 of Shiga et al. is entitled "Burnishing Drill." The Shiga et al. patent discloses a cylindrical shank and a drill body connected to the shank. Drilling edges, reaming faces and reaming edges are formed on a first reduced diameter portion, a second reduced diameter portion and a third reduced diameter portion located at a foremost end of the drill body respectively. The reaming faces which are located axially at rearward positions of the drilling edges and the reaming edges extend radially outward from the foremost end of the drill and incline axially in the rearward direction with respect to the rotational direction. Since an inner surface of the hole is drilled and reamed by the drilling edges and the reaming edges can be further smoothed by the reaming faces, the surface roughness of the finished hole can be improved.

Notwithstanding the above, it is presently believed that there may be a commercial market for an improved rotary drill in accordance with the present invention. There should be a commercial market for such tools since they offer improved cutting by a frusto conical file which is durable and which provides an improved cutting edge over an extended period of time. Further, the rotary tools in accordance with the present invention can be manufactured with different degrees of coarseness for different purposes and at a competitive price.

In addition, the rotary tools in accordance with the present invention are made of a hard steel and have a high resistance to breakage and are capable of maintaining a sharp cutting edge and are resistant to fracture. Further, it is presently believed that the composition of a rotary tool in accordance with the present invention can be adjusted to optimize the performance of the tool with respect to the composition of the workpiece.

BRIEF SUMMARY OF THE INVENTION

In essence, the present invention contemplates a one-piece or unitary rotary tool for performing a plurality of operations on a workpiece. The rotary tool or drill includes an integral hardened steel shank adapted to fit into a chuck of a manual or preferably an electric drill for rotation thereby. The tool also includes an integral drill bit and a frusto conical file between the shank and the drill bit all of which are disposed on a common longitudinal axis. The frusto conical file includes an outer peripheral surface (including a plurality of teeth) which form or define an angle of between about 15° and 55° with respect to the longitudinal axis of the tool. In addition, the composition of the steel includes from about 0.45 weight percent to about 0.65 weight percent of carbon in order to increase the strength of the tool. The composition also includes between about 2.25 percent silicon and about 0.4 percent to about 1.4 percent by weight molybdenum. The latter of which increases the hardness. In addition, the composition includes between about 1.5 percent by weight to about 3.25 percent by weight chrome for increasing the friction resistance of the tool. Further, the composition includes less than 0.45 weight percent of sulfur and phosphorous which would otherwise contribute to the breakage of the tool. It is also contemplated that small amounts of less than about one weight percent each of nickel, tungsten and cobalt may be included as will be well understood by persons of ordinary skill in the art of tool making metallurgy. Such metals may improve the tools ability to withstand higher temperatures and provide improved cutting. In addition, the steel compositions are preferably hardened by heat treatment at a temperature of between about 1,330° F. to about 1,350° F. In a preferred embodiment of the present invention the frusto conical file includes a plurality of crowned teeth about its periphery and wherein each of the plurality of teeth have a front cutting side and a back side and in which each tooth includes a plurality of sharp serrations extending longitudinal of each tooth formed on the backside of the tooth adjacent to the cutting edge.

The invention will now be described in connection with the accompanying drawings wherein like references numbers will be used to define like parts.

DESCRIPTION OF THE PREFERRED EMBODIMENTS OF THE INVENTION

Figure 1:
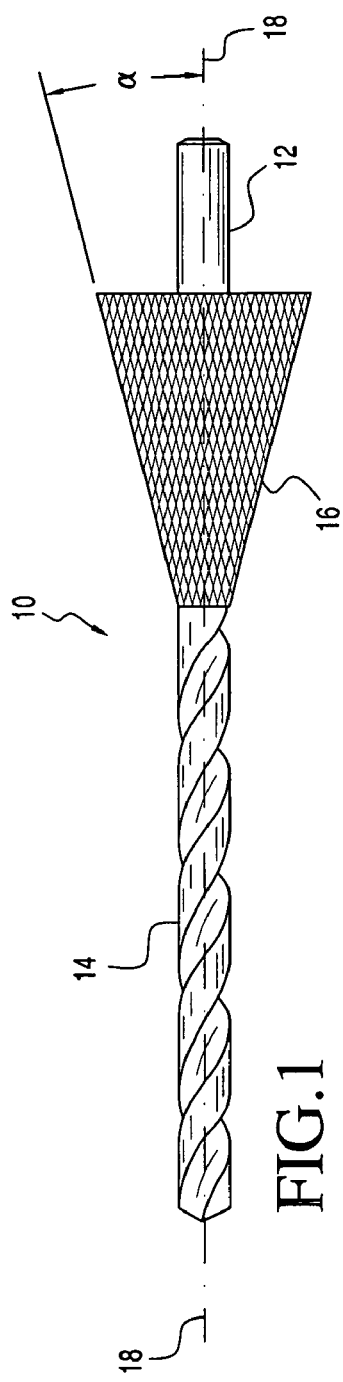
FIG. 1 is a side elevational view of a rotary tool in accordance with one embodiment of the invention.

A one-piece rotary tool 10 for performing a plurality of operations on a workpiece is illustrated in FIGS. 1-5. As shown therein, the tool 10 of hardened tool steel includes a shank 12 which extends from or forms a rearward portion of the tool 10 and is adapted to fit into a chuck 20 (FIG. 2) of an electric drill 22 shown in FIG. 2. As illustrated, the tool 10 includes a forward portion in the form of a drill bit 14 and a frusto conical file 16.

Figure 2:
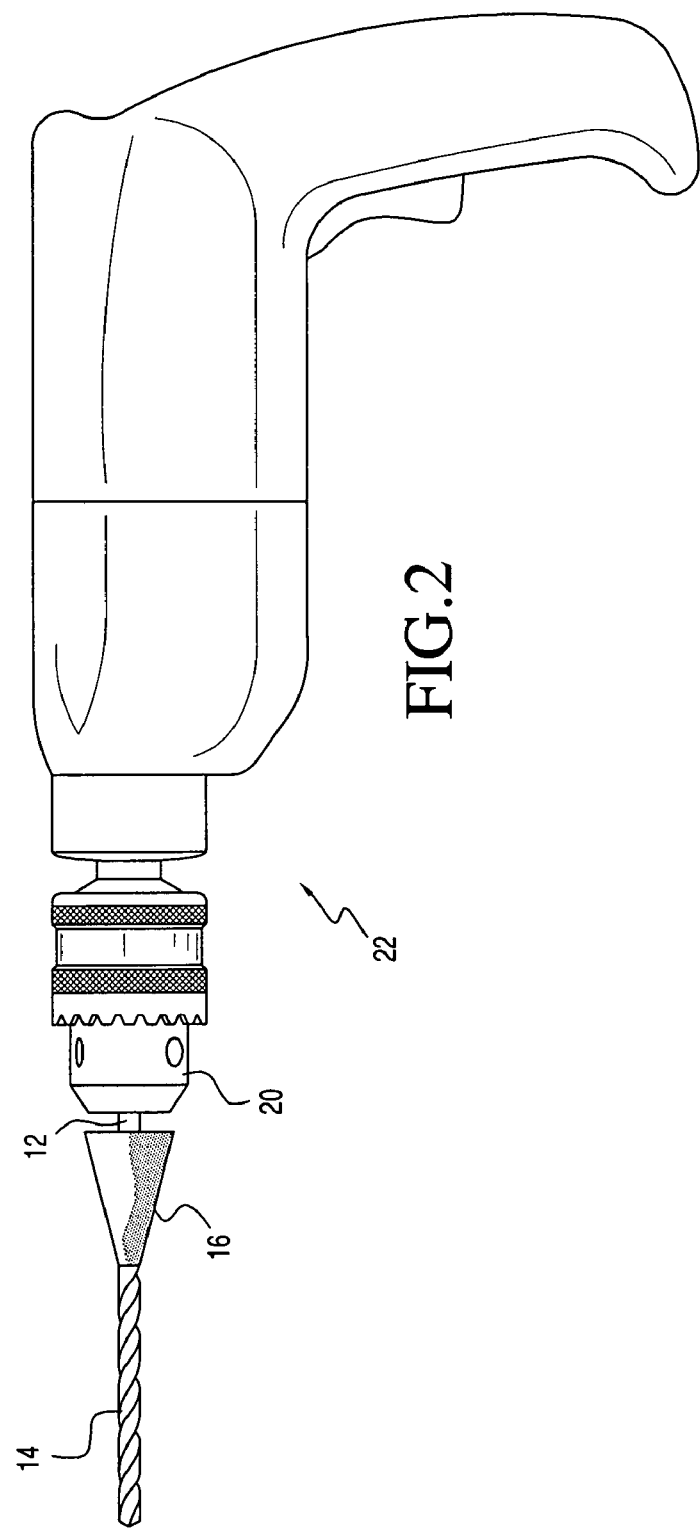
FIG. 2 is a side elevational view of an electric drill having a rotary tool in accordance with the present invention clamped therein.

As shown in FIGS. 1 and 2, the frusto conical file 16 defines an angle of about 15 degrees with respect to the common longitudinal axis 18 of the tool 10. In the preferred embodiment of the invention, the composition of the steel includes about 0.55 percent by weight carbon, about 2.25 percent by weight silicon, about 0.9 percent by weight molybdenum and about 2.4 percent by weight chrome. Other materials such as nickel, tungsten and cobalt may also be included. However, it is desirable to limit sulphur and phosphorous to no more than 0.45 percent in order to avoid weakening of the tool.

Figure 3:
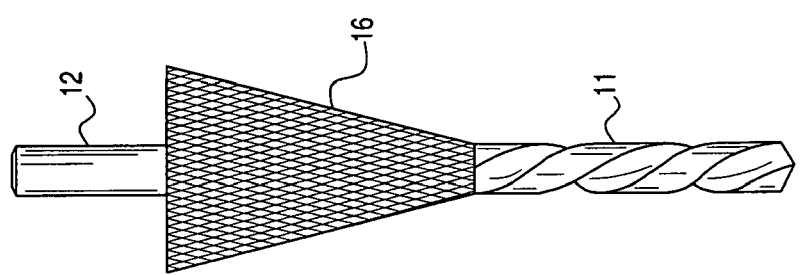
FIG. 3 is a side elevational view of a rotary tool in accordance with another embodiment of the present invention wherein a drill bit portion has a relatively short length.

A second embodiment of the invention is illustrated in FIG. 3 wherein a drill bit 11 is considerably shorter than the bit 10 in FIGS. 1 and 2. In this embodiment of the invention, the composition of the steel includes between about 0.45 percent to about 0.65 percent, about 2.25 percent silicon, about 0.4 percent to about 1.4 percent molybdenum and from 1.5 to about 3.5 percent chrome. All of the percentages are expressed as percent by weight.

Figure 4:
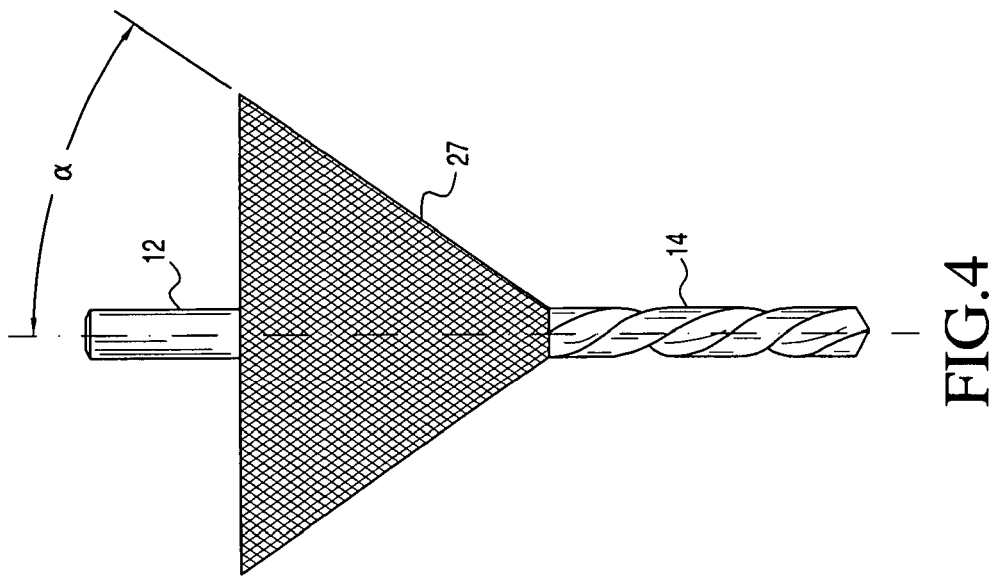
FIG. 4 is a cross sectional view of a rotary tool in accordance with a further embodiment of the invention as shown within a workpiece.

FIG. 4 illustrates a further embodiment of the invention wherein the frusto conical file 27 defines an angle of about 55 degrees.

Figure 5:
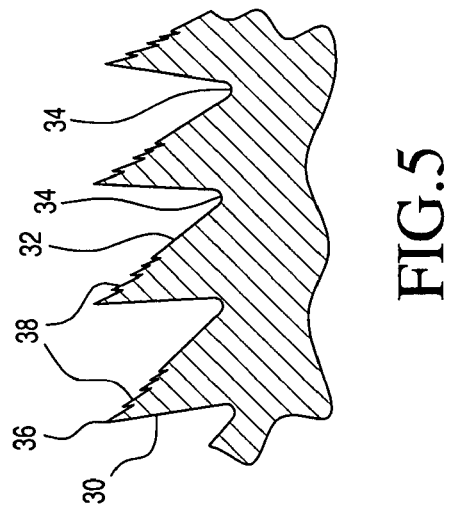
FIG. 5 is an enlarged cross sectional view of the file teeth in a preferred embodiment of the invention.

An important feature in the present invention resides in the use of a frusto conical file as opposed to a frusto conical element which includes abrasive media or removable blades attached thereon. A preferred form of a file as used in the present invention is illustrated in FIG. 5. As shown therein, a plurality of crowned teeth having a relatively steep front side 30 and an inclined back side 32. The gulleys 34 at the conjunction of the base of adjacent teeth may be either sharply angled or rounded as shown. The cutting edge 36 of each tooth generally comprises a sharp point at the conjunction of the front side 30 and the backside 32. Further, a plurality of sharp serrations 38 extend longitudinally of the teeth and generally transversely of the file, which serrations are found in the upper portion of the back sides of the teeth, generally parallel to the cutting edge 36, as illustrated in FIG. 5.

In the preferred embodiment of the invention the rotary drill comprises a unitary or one-piece hardened steel shank which is adapted to fit into the chuck of an electric drill. The tool also includes a drill bit and a frustoconical file disposed between the shank and drill bit along a common longitudinal axis. In this embodiment of the invention, the frustoconical file includes an outer periphery that defines an angle of 35° or about 35° with respect to the common longitudinal axis of the tool. In this embodiment the composition of the steel tool includes about 0.55% by weight carbon, about 2.25% by weight silicon, 0.9% by weight molybdenum, 2.4% by weight chrome and less than 0.45% by weight sulphur and phosphorous and wherein the frustoconical file includes a plurality of crowned teeth about its periphery. In addition, each of the plurality of teeth have a front cutting side and a backside and each tooth includes a plurality of sharp serrations extending longitudinally of each tooth and formed on the backside of each tooth adjacent to cutting edge thereof.

Figure 6:
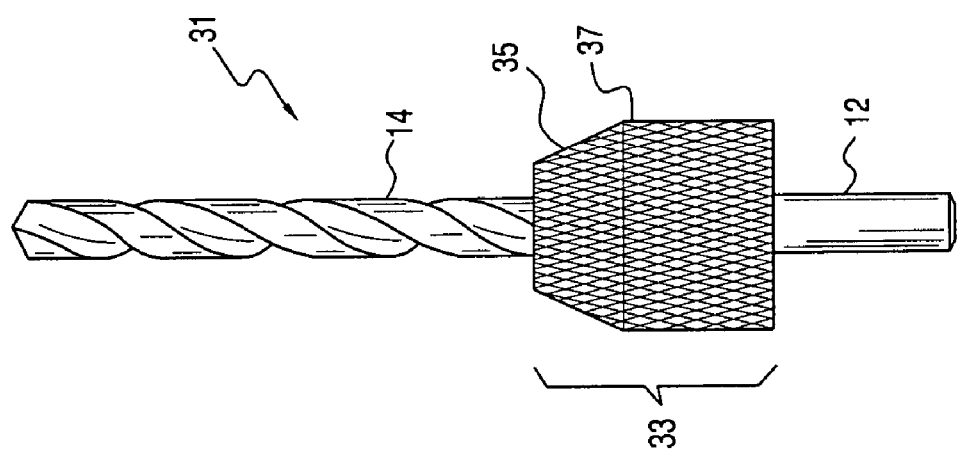
FIG. 6 is a side elevational view of a Rotary Tool in accordance with another embodiment of the invention.

As shown in FIG. 6, a rotary tool 31 includes a shank 12, a drill bit 14 and a file portion 33 having a frusto conical forward portion 35 and a cylindrical rear or base portion 37. The tool 31 as shown in FIG. 6 has a unitary one-piece construction.

Figure 7:
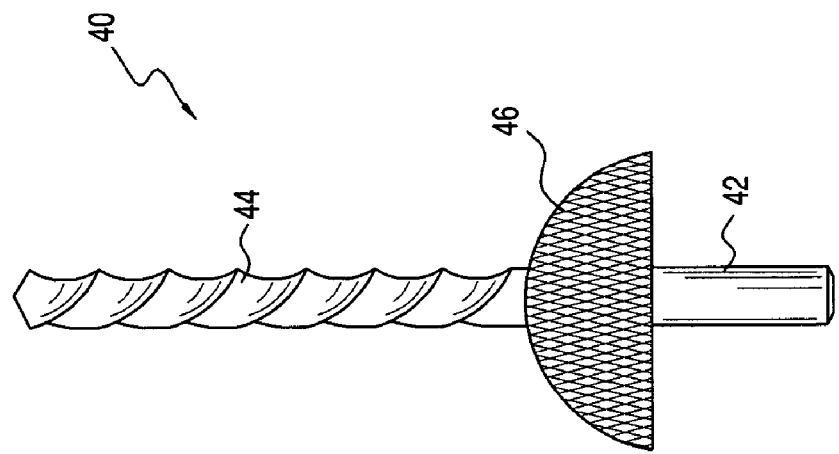
FIG. 7 is side elevational view of a Rotary Tool in accordance with a further embodiment of the invention.

Another embodiment of the invention is illustrated in FIG. 7 wherein a Rotary Tool 40 includes a shank 42 and drill bit 44. As illustrated, a file portion 46 of the Rotary Tool 40 forms a frusto hemisphere i.e. having a cross sectional shape of a semi-circle with a relatively flat small portion at the top where the drill bit 44 enters into the hemisphere in axial alignment with a shank 42. The Rotary Tool 40 may have a relatively short or relatively long drill bit as well as a relatively small or relatively large diameter. Nevertheless, for practical considerations, it is believed that the frusto spearical portion should have a diameter of about 2.5 cm to about 3.6 cm. As illustrated in FIG. 7 the diameter of the file portion 46 i.e. the hemisphere is preferably about 2.5 cm while the diameter illustrated in FIG. 6A is about 3.6 cm.

Figure 10:
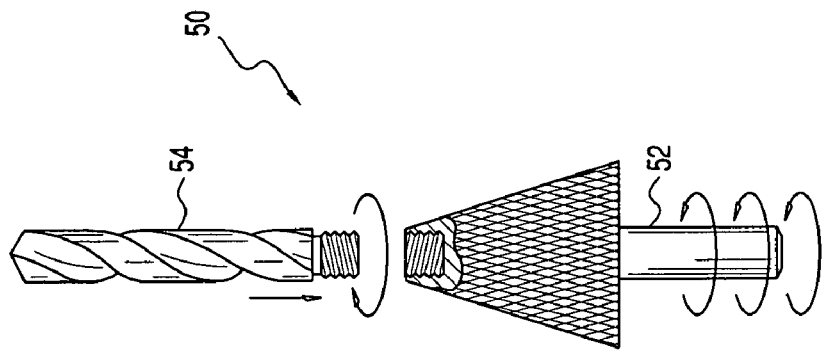
FIG. 10 is a side elevational view of a two-piece rotary drill in accordance with a further embodiment of the invention wherein the drill has a two-piece construction.
Figure 9:
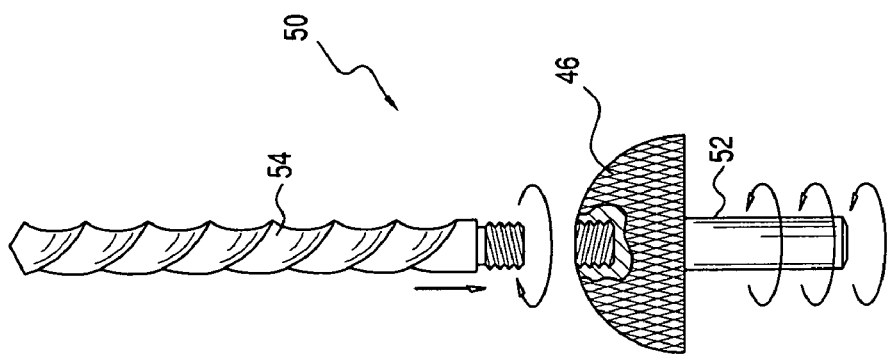
FIG. 9 is a side elevational view of a two-piece rotary drill according to another embodiment of the invention wherein the drill has a two-piece construction.
Figure 8:
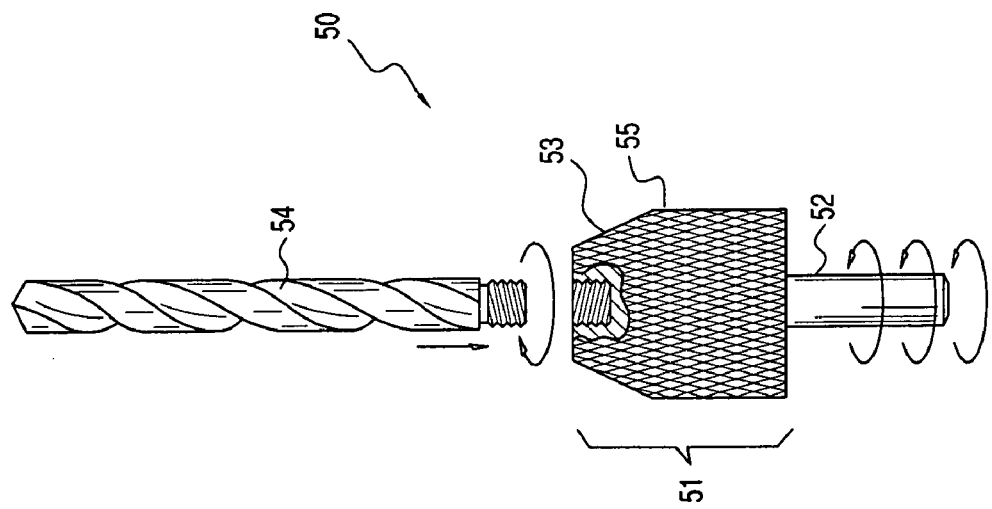
FIG. 8 is a side elevational view of a rotary drill in accordance with a further embodiment of the invention wherein the drill has a two-piece construction.

Further embodiments of the invention are shown more clearly in FIGS. 8, 9, and 10. As shown, each of the tools 50 includes a shank 52 and drill bit 54. However, as shown in FIG. 8 the rotary tool includes a file portion 51 having a six-sided cross section, a frusto conical file portion 53 and a cylindrical file portion 55. An important element in each of the Rotary Tools shown in FIGS. 8, 9, and 10 is a removable drill bit which is screwed into the file portion with a left hand thread, so that, the use with a drill tends to tighten the drill bit. As illustrated in FIGS. 8, 9 and 10, the length of the drill bit 54, may be relatively short as shown in FIG. 10 or relatively long as shown in FIG. 8. Further, the diameters of the drill bits 54 may vary as illustrated in FIGS. 8 and 9. The thickness and length and type of drill may also be varied for various application such as for use with wood or steel which will be well understood by persons of ordinary skill in the art. It should also be recognized that the coarseness of the file portion may also vary.

In addition, it also contemplated that the rotary tools in accordance with the present invention may be provided in sets of drills with different size and shaped file portions and different size drill bits. Thus, the use of a two-piece structure allows the use of a particular size and shaped file portion with different drill bits for different applications. For example, different shaped file portions 51, are illustrated in FIGS. 8, 9, and 10. Further, it is also contemplated that a rotary tool may be used for inserting screws into a previously caped opening.

FIG. 8 shows the coarseness of a file portion 53 which will vary for different applications. For example, the coarseness as shown might be suitable for relatively soft metals while a different coursness might be appropriate for wood.

It is also contemplated that a drill bit may be replaced by a removable screw that may be left in the work piece. In this application, the screw may be threaded into the file portion (not shown) or placed therein with a crosscut or slot with a Philips head or regular screw head which is magnetized so that the screw is held in place.

While the invention has been described in connection with its preferred embodiments, it should be recognized that changes and modifications may be made therein without departing from the scope of the appended claims.

What is claimed is:

1. A one-piece rotary tool for performing a plurality of operations on a work piece, said rotary tool comprises a hardened steel shank adapted to fit into a chuck of an electric drill, and an axially aligned drill bit and file portion having a forward portion adjacent to said drill bit and rear portion adjacent said shank and wherein the diameter of said file portion increases between said front and rear portions and in which the file portion has a shape of a hemisphere, and wherein the composition of said steel includes from 0.45 percent by weight to about 0.65 percent by weight carbon, about 2.25 percent by weight silicon, from 0.4 percent by weight to about 1.4 percent by weight molybdenum, from 1.5 to about 3.25 percent by weight chrome and less than 0.45 percent by weight sulfur and phosphorous, and wherein said file portion includes a plurality of crowned teeth about its periphery and wherein each of said plurality of teeth have a front cutting side and a back side and in which each tooth includes a plurality of sharp serrations extending longitudinal of each tooth and formed on the backside of each tooth adjacent the cutting edge thereof.

2. A two-piece rotary drill for performing a plurality of operations on a work piece, said rotary drill comprising a rotary drill set for performing a plurality of operations on a work piece, said drill set including a plurality of two-piece rotary drills each of which includes a hardened steel shank adapted to fit into the chuck of an electric drill, a drill bit and a file portion between said shank and said drill bit along a common longitudinal axis and wherein said file portion has a frusto spherical shape, wherein said removable drill bit is screwed into said file portion with a left hand thread and wherein the composition of said steel tool includes 0.55 percent by weight carbon, 2.25 percent silicon, 0.9 percent by weight molybdenum, 2.4 percent by weight chrome and less than 0.45 percent by weight sulfur and phosphorous, and wherein said file portion includes a plurality of crowned teeth about its periphery and wherein each of said plurality of teeth have a front cutting side and a back side and in which each tooth includes a plurality of sharp serrations extending longitudinal of each tooth and formed on the backside of each tooth adjacent the cutting edge thereof.

* * * * *